(12) United States Patent
Kessler et al.

(10) Patent No.: US 9,420,326 B1
(45) Date of Patent: Aug. 16, 2016

(54) SYSTEMS AND METHODS FOR CONTROLLING USER EQUIPMENT

(71) Applicant: Rovi Guides, Inc., Santa Clara, CA (US)

(72) Inventors: Brandon Kessler, Burbank, CA (US);
Walter R. Klappert, Los Angeles, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/700,721

(22) Filed: Apr. 30, 2015

(51) Int. Cl.
*H04N 5/44* (2011.01)
*H04N 21/422* (2011.01)
*H04N 21/482* (2011.01)
*H04N 21/466* (2011.01)
*H04N 21/442* (2011.01)

(52) U.S. Cl.
CPC ....... *H04N 21/42204* (2013.01); *H04N 5/4403* (2013.01); *H04N 21/44222* (2013.01); *H04N 21/466* (2013.01); *H04N 21/482* (2013.01); *H04N 2005/4444* (2013.01)

(58) Field of Classification Search
CPC .................. H04N 5/4403; H04N 2005/4444; H04N 21/44222

USPC .................. 348/734; 725/10, 12, 13
See application file for complete search history.

(56) References Cited

U.S. PATENT DOCUMENTS

| 2006/0095938 | A1* | 5/2006 | Joo | H04N 5/44543 725/46 |
| 2011/0058107 | A1* | 3/2011 | Sun | G06F 3/017 348/734 |

* cited by examiner

*Primary Examiner* — Dominic D Saltarelli
(74) *Attorney, Agent, or Firm* — Ropes & Gray LLP

(57) ABSTRACT

Methods and systems are disclosed for a media guidance application that controls user equipment devices by automatically issuing frequently-used sequences of user commands with a remote control device. For example, the media guidance application may determine that a user typically inputs a particular series of commands when they use a user equipment device at a certain time (e.g., navigating to a March Madness application during March). The media guidance application may then identify the user when he or she picks up the remote control and automatically, without user input, cause the remote control to issue the appropriate user command sequence. The media guidance application may also determine new or augmented sequences based on additional inputs received from the user. This may allow users to more easily navigate to and use their favorite services.

20 Claims, 8 Drawing Sheets

600

| COMMAND SEQUENCE ENTRY |
|---|
| 602 — `<USER_COMMAND_SEQUENCE>` |
| 604 —     `<USER_DETAILS>` |
| 606 —         `<USER_NAME> JOHN SMITH </USER_NAME>` |
| 608 —         `<USER_PROFILE_ID> A1234567 </USER_PROFILE_ID>` |
| 610 —         `<USER_BIOMETRIC_ID> F987654 </USER_BIOMETRIC_ID>` |
| 612 —     `</USER_DETAILS>` |
| 614 —     `<SEQUENCE_COMMANDS>` |
| 616 —         `<COMMAND> POWER </COMMAND>` |
| 618 —         `<COMMAND> GUIDE </COMMAND>` |
| 620 —         `<COMMAND> ARROW_RIGHT </COMMAND>` |
| 622 —         `<COMMAND> ARROW_RIGHT </COMMAND>` |
| 624 —         `<COMMAND> SELECT </COMMAND>` |
| 626 —     `</SEQUENCE_COMMANDS>` |
| 628 — `</USER_COMMAND_SEQUENCE>` |

FIG. 6

SYSTEMS AND METHODS FOR CONTROLLING USER EQUIPMENT

BACKGROUND

In conventional systems, users are able to access a plethora of media assets and services across a wide variety of devices. Furthermore, the user may access the plethora of media assets and services by navigating a series of on-screen menus. To do so, the user is often forced to repeatedly input the same set or sets of commands to perform a desired task. Such repetition is often tedious and thus negatively impacts the viewing experience of the user.

SUMMARY

Accordingly, methods and systems are disclosed herein for a media guidance application that improves the viewing experience of a user by automatically issuing sequences of frequently entered user commands with a remote control device. For example, the media guidance application may recognize and record frequently entered sequences of user commands issued by the user when navigating a menu. The media guidance application may automatically issue the sequence of user commands when the user subsequently accesses the menu. By automating this process, the media guidance application relieves the user from having to repeatedly enter the same sequence of commands.

To achieve this, the media guidance application may monitor issued user commands to determine a user command sequence and associate it with a given user. In particular, the media guidance application may automatically select and issue an appropriate user command sequence when it detects that a user intends to use a remote control device. For example, the media guidance application may determine when a user picks up a remote control device that the user is likely to issue a particular sequence of user commands (e.g., a series of commands that accesses a particular service or menu, such as a list of programs recently recorded to the user's DVR). The media guidance application may then issue the particular sequence of user commands using the remote control device. By doing so, the media guidance application may provide the user with access to a service or menu that he or she is likely to use or uses frequently without requiring the user to repeatedly input the same set of commands.

In some aspects, a media guidance application may detect (e.g., using control circuitry) that a user intends to use a remote control device. In some embodiments, the media guidance application may detect a movement of the remote control device. For example, the media guidance application may use an accelerometer integrated into the remote control device to detect that the remote control has been moved. For example, if the media guidance application detects that the remote control device has been raised (e.g., lifted from a surface) and is being held horizontally, the media guidance application may determine that a user intends to use the remote control device.

The media guidance may then determine (e.g., using control circuitry) an identity of the user. In some embodiments, the media guidance application may identify a biometric characteristic (e.g., fingerprints, palm vein patterns, hand geometry, facial geometry, etc.) associated with the user. For example, the media guidance application may use a fingerprint reader integrated into the housing of the remote control device to determine the identity of the user based on his or her fingerprint.

The media guidance application may then cross-reference (e.g., using control circuitry) a database (e.g., a remote server) listing user command sequences frequently inputted by the identified user to determine a user command sequence with a high frequency of use. In some embodiments, a user command sequence may comprise an ordered set of one or more commands issued using the remote control device for controlling a user equipment device. For example, the user commands in the user command sequence may correspond to buttons on a remote control device and/or to any commands that can be received by the user equipment device, whether or not they correspond to buttons on a given remote control device, including but not limited to navigational commands (such as directional commands), activation commands (such as on/off commands), and/or content interaction commands (such as a pause command).

In some embodiments, the media guidance application may rank (e.g., using control circuitry) the user command sequences frequently inputted by the identified user based on a frequency of use of each of the user command sequences. For example, when cross-referencing the database of user command sequences, the media guidance application may rank the user command sequences based on how frequently each has been used over a given period of time. The media guidance application may use this ranking to select a user command sequence to be issued. For example, the media guidance application may select the most frequently used sequence based on this ranking.

In some embodiments, in order to determine whether to issue the user command sequence from the remote control, the media guidance application may compare (e.g., using control circuitry) a frequency of use of the user command sequence to a threshold frequency of use. For example, the media guidance application may determine (e.g., by cross-referencing the database of user command sequences discussed above) that a given user command sequence is used, on average over the past week, twice per day. If the minimum usage threshold is set at once per day, the media guidance application may determine that it should issue the user command sequence since its frequency of use is greater than the threshold frequency of use.

The media guidance application may, in response to determining the user command sequence with the high frequency of use, issue (e.g., using control circuitry) the user command sequence from the remote control automatically and without user input. For example, if the media guidance application is implemented at least partially on the remote control device, the media guidance application may use the communication interface and associated circuitry of the remote control device to issue the user command sequence. If the media guidance application is implemented on a separate user equipment device (e.g., the media guidance application is implemented on a desktop computer and the remote control device being used is a smartphone), the media guidance application may transmit a request to the remote control device to issue the user command sequence.

In some embodiments, the media guidance application may monitor (e.g., using control circuitry) issued commands from the user over a period of time. For example, the media guidance application may record a log (e.g., located at storage circuitry) of commands issued by the user (i.e., not automatically issued using the methods described herein). The commands may be stored for a regular period of time (e.g., a calendar month) or over the course of one or more usage sessions (e.g., from the time when the user equipment device is powered on until the time when the user equipment device is powered off). The media guidance application may record information beyond the commands themselves, including but not limited to the time at which the commands were received as well as the identity of the user issuing the commands.

The media guidance application may then determine (e.g., using control circuitry) a recent user command sequence associated with the user based on the issued commands. For example, the media guidance application may determine that, over the past seven days, the user has issued the same sequence of commands each time the remote control was first used in the morning. Based on this, the media guidance application may determine that this sequence of commands constitutes a recent user command sequence associated with the user. In some cases, the media guidance application may determine that a set of user commands comprise a user command sequence only if each command in the sequence is received within a period of time (e.g., five seconds) of the previous command. In other cases, the media guidance application may determine that a set of user commands comprise a user command sequence only if the sequence comprises fewer than or more than a given threshold number of inputs. For example, the media guidance application may only determine that a set of user commands comprise a user command sequence if the set contains at least five commands. In another case, the media guidance application may set a maximum length of time in which the set of user commands comprising a user command sequence may take place. For example, the media guidance application may determine that a set of user commands comprise a user command sequence only if the set of user commands is received within a span of 30 seconds. In yet another case, the media guidance application may determine that a set of user commands comprise a user command sequence only if the same set of user commands is received more than a certain threshold number of times during a given period of time. For example, the media guidance application may determine that a set of user commands comprise a user command sequence only if the set is received at least five times over the course of a week. These thresholds may be set according to user preferences, default programming, or any other suitable criterion. The media guidance application may then cause the user command sequence to be stored, such as at the database of user command sequences discussed above.

In some embodiments, the media guidance application may, when determining a user command sequence, determine (e.g., using control circuitry) a current time. In some cases, the media guidance application may determine the current time using a clock integrated into the system on which the media guidance application is implemented. In other cases, the media guidance application may determine the current time by querying a remote service (e.g., using a communications network). For example, the media guidance application may determine that the current time is 7:10 AM on a Saturday in April.

The media guidance application may also determine a time stamp associated with a previous use of the user command sequence. For example, the media guidance application may determine that the user command sequence has a time stamp that indicates that the user command sequence was last used at 7:05 AM two days ago. In another example, the media guidance application may determine that the user command sequence has a time stamp that indicates that the user command sequence is often issued at 7:05 AM on weekdays. The media guidance application may determine the time stamp by cross-referencing the database of user command sequences. In such a case, the time stamp for each user command sequence may be stored in the database and associated with the corresponding user command sequence.

The media guidance application may then select (e.g., using control circuitry) the user command sequence based on determining that the current time and the time stamp correspond. To do this, the media guidance application may compare the current time to the time stamp. The media guidance application may determine that the current time and the time stamp correspond if the indicated times fall within a given threshold range of time (e.g., that they fall within 20 minutes of one another). This threshold range may be set according to user preferences, default programming, or any other suitable criterion. Following one of the examples given above, if the time stamp indicates that the user command sequence was last issued at 7:05 AM two days ago, the media guidance application may compare the current time (7:10 AM on a Saturday) to the time stamp and determine that the two times fall within 20 minutes of one another and thus correspond. Following the other example given above, if the time stamp indicates that the user command sequence is usually issued at 7:05 AM on weekdays, the media guidance application may compare the current time (7:10 AM on a Saturday) to the time stamp and determine that the two times do not correspond as Saturday is not a weekday.

In still another example, the user may often issue a certain user command sequence to access a March Madness application on his or her Xbox in the month of March. The media guidance application may determine that such a user command sequence has a time stamp that indicates that the user command sequence is often issued after 5:00 PM on days in March. Based on the current time given above (7:10 AM on a Saturday in April), the media guidance application may determine that the two times do not correspond as the current time is not after 5:00 PM and it is no longer March.

In some embodiments, the media guidance application may determine (e.g., using control circuitry) whether a user equipment device is active. For example, the media guidance application may detect that the user has picked up the remote control associated with the user's set-top box. The media guidance application may then determine whether the set-top box is active. For example, the media guidance application may determine that the set-top box is powered on, but the television to which the set-top box is connected is set to component input (e.g., for a video game console) instead of HDMI (e.g., for the set-top box). In such a case, the media guidance application may determine that the set-top box is not active.

In response to determining that the set-top box (or any other given user equipment device) is not active, the media guidance application may query (e.g., using control circuitry) the user equipment device to determine a command for making the user equipment active. For example, the media guidance application may determine, based on a user profile, the model of the user equipment device. The media guidance application may then cross-reference the model of the user equipment device with a database of models of user equipment devices and their corresponding commands. Based on this cross-referencing, the media guidance application may determine the appropriate command to issue using the remote control device. In another example, the media guidance application may query the user equipment device directly to determine the proper activation command (e.g., if the user equipment device is powered on but otherwise inactive, as defined below).

After determining the command for making the user equipment active, the media guidance application may issue (e.g., using the remote control), automatically and without user input, the command for making the user equipment device active. Following the example given above, the media guidance application may use the remote control to issue the command to change the television input from component to HDMI in order to make the set-top box active. Once the user equipment device is active, the media guidance application may determine and issue a user command sequence as previously discussed.

In some embodiments, the media guidance application may detect (e.g., using control circuitry) an input from a user. For example, the media guidance application may issue a user command sequence from the remote control, as described above. After the user command sequence has been issued, the media guidance application may detect an input from the user. The media guidance application may then create (e.g., using control circuitry) an augmented user command sequence based on the input and the user command sequence. For example, the media guidance application may create an augmented user command sequence that adds to or replaces a portion of the user commands in the user command sequence, as appropriate. Once the augmented user command sequence has been created, the media guidance application may cause the augmented user command sequence to be stored (e.g., using the database of user command sequences).

In some cases, the media guidance application may only use the detected user input to augment the user command sequence if it is detected within a certain period of time after the user command sequence is issued. For example, the media guidance application may only create the augmented user command sequence if the new input is received within five seconds of the user command sequence being issued. This threshold time period may be set according to user preferences, default programming, or any other suitable criterion.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 shows an exemplary data structure for a user command sequence in accordance with some embodiments of the disclosure;

DETAILED DESCRIPTION OF THE DRAWINGS

Figure 1:
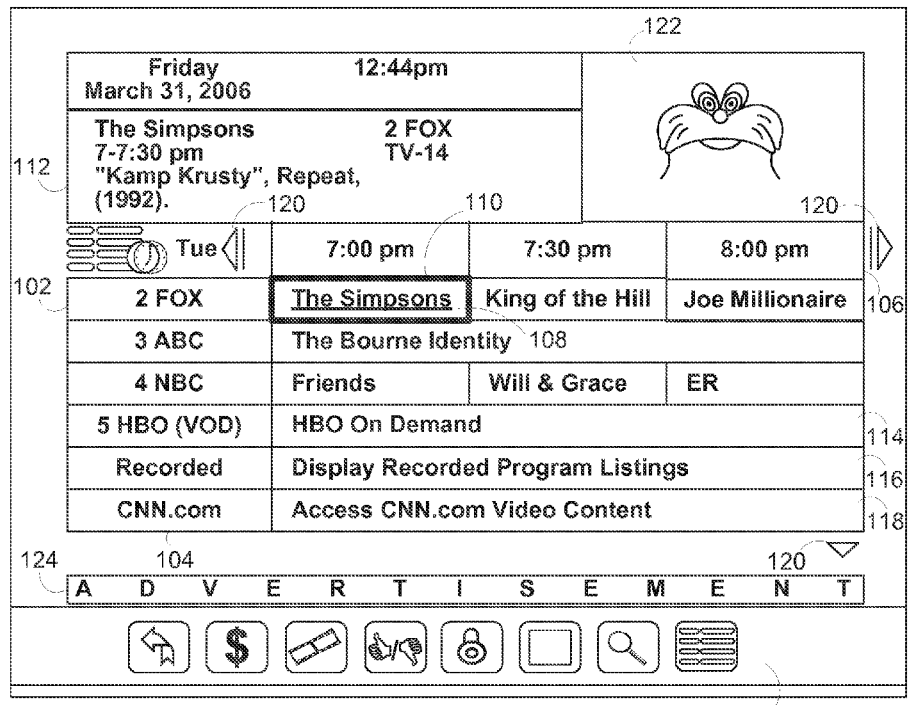
FIG. 1 shows and illustrative example of a display screen generated by a media guidance application in accordance with some embodiments of the disclosure.

Methods and systems are disclosed herein for a media guidance application that controls user equipment devices by automatically issuing sequences of these user commands with a remote control device. Additionally, the media guidance application may recognize and record new sequences of user commands. To achieve this, the media guidance application may monitor issued user commands to determine a user command sequence and associate it with a given user. In particular, the media guidance application may automatically select and issue an appropriate user command sequence when it detects that a user intends to use a remote control device. For example, the media guidance application may determine, when a user picks up a remote control device, that the user is likely to issue a particular sequence of user commands (e.g., a series of commands that accesses a particular service or menu, such as a particular set of channels in a programming guide). The media guidance application may then issue the particular sequence of user commands using the remote control device. By doing so, the media guidance application may provide the user with access to a service or menu that he or she is likely to use or uses frequently without requiring the user to repeatedly input the same set of commands.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
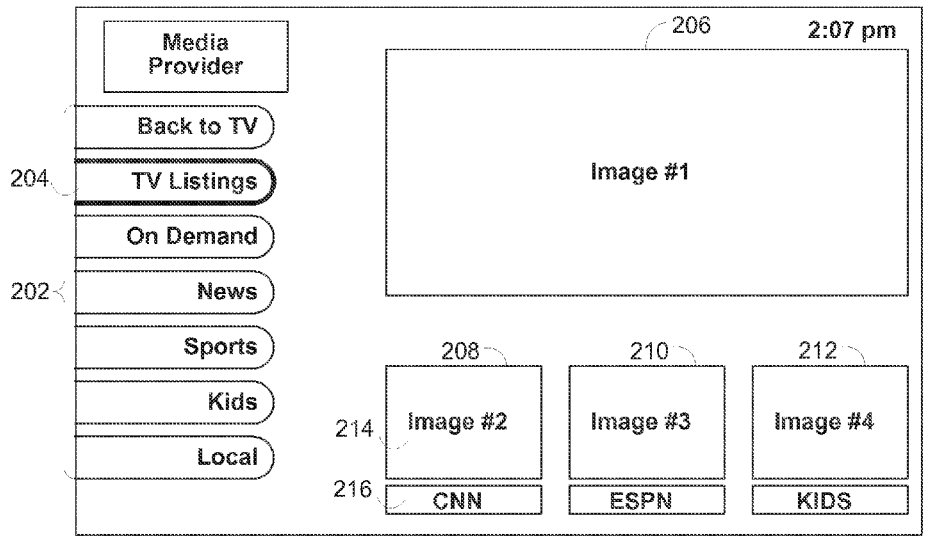
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
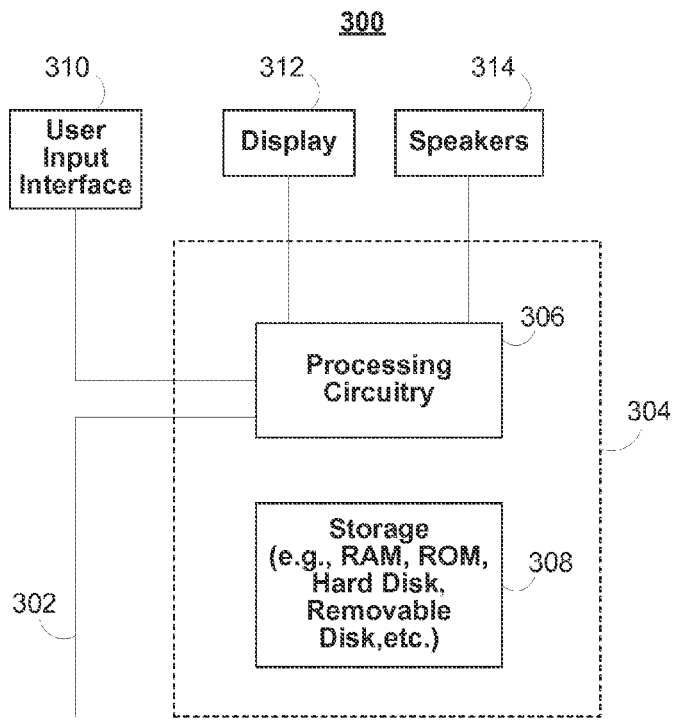
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
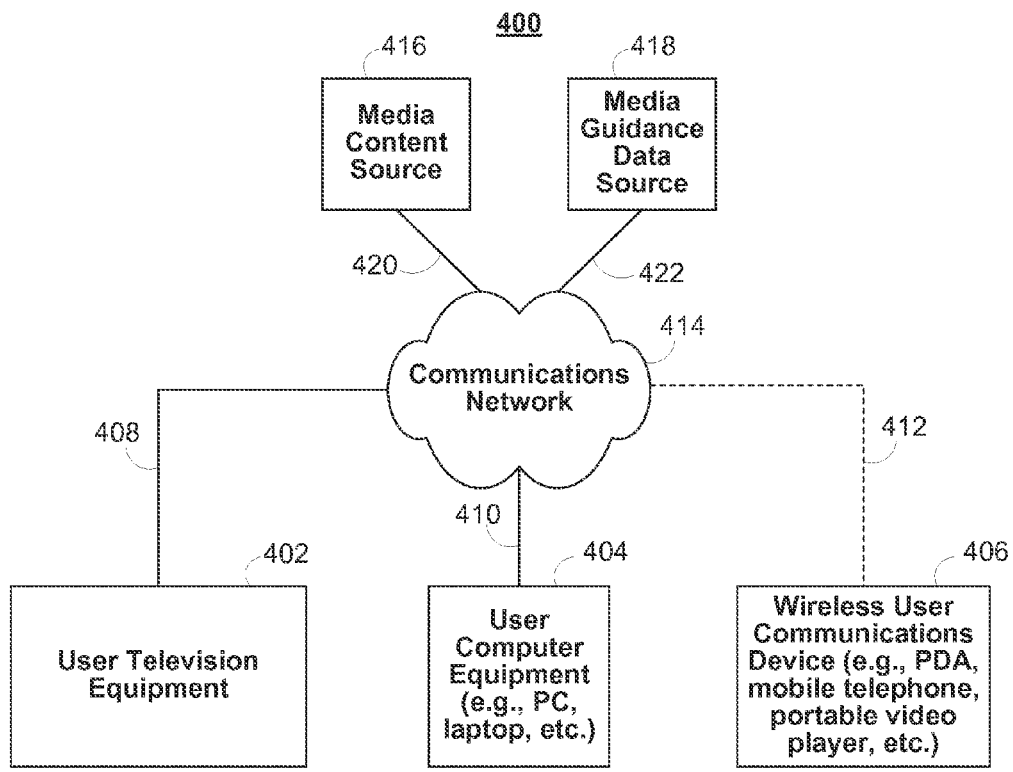
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices.

Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, a "user command" is any instruction that can be triggered by a user for controlling a user equipment device. Examples of these commands, as discussed previously, include but are not limited to navigational commands (such as directional commands), activation commands (such as on/off commands), and content interaction commands (such as a pause command). User commands may be issued using a conventional remote control device, another user equipment device such as a smartphone or tablet, or any other suitable device. User commands may be issued locally (e.g., using an infrared transmitter) or remotely (e.g., using a communications network).

As referred to herein, a "user command sequence" is defined to be an ordered set of user commands (as defined above). A user command sequence may comprise any number of user commands. In some examples, a user command sequence may be issued using a single device, such as a conventional remote control device, and received by a single user equipment device, such as a set-top box. In other examples, a user command sequence may be issued using multiple devices, such as a conventional remote control device as well as a smartphone, and be received by multiple user equipment devices, such as a set-top box and a desktop computer. In such a case, for a user command sequence comprising five user commands, the conventional remote control device may be used to issue the first three user commands to the set-top box and the smartphone may be used to issue the last two user commands to the desktop computer. In some embodiments, the media guidance application may allow the user to split or combine the displays generated by these multiple user equipment devices in order to view feeds from the devices simultaneously.

As referred to herein, an "augmented user command sequence" is defined to be a user command sequence that has been edited or amended (automatically by the media guidance application or manually by a user) after initially being stored. For example, an augmented user command sequence may comprise an original user command sequence as well as one or more new user commands added to the end of the original user command sequence. The new user commands may be inserted at any point in the user command sequence. The new user commands may be recognized and added automatically, as discussed in further detail with regard to FIG. 9. Alternately, the new user commands may be added manually, e.g., through a dedicated user interface or menu.

In another example, an augmented user command sequence may comprise an original user command sequence that has had one or more user commands replaced by one or more new user commands. Again, the new user commands may replace any user command in the original user command sequence. The portion of the original user command sequence that is replaced need not contain the same number of user commands as the set of new user commands replacing it. As above, the new user commands may be recognized and added automatically, as discussed in further detail with regard to FIG. 9. Alternately, the user command replacement may be done manually, e.g., through a dedicated user interface or menu.

As referred to herein, a "frequency of use" is defined to be any measure of how often a user command sequence is issued. In some examples, a frequency of use may be an integer number of times that a user command sequence has been issued over a given period of time. In other examples, a frequency of use may be an average number of times that a user command sequence has been issued per one period of time (for example, per day) as measured over another period of time (for example, over the course of the past month). In still other examples, a frequency of use may be a length of time since the user command sequence was last issued (i.e., not an actual frequency). A frequency of use may reset on a regular basis (e.g., each calendar month) or be calculated on a continual rolling basis. The period or periods of time over which a frequency of use is calculated and/or stored may be set according to user preferences, default programming, or any other suitable criterion.

As referred to herein, a "biometric characteristic" is defined to be any measurable characteristic that can be uniquely associated with an individual and used to identify and/or distinguish that individual from other individuals. Examples of biometric characteristics include, but are not limited to, fingerprints, DNA, and retinal patterns. A description of a biometric characteristic may be stored in any suitable data structure and then used to identify a user. For example, the media guidance application may receive an image or three-dimensional representation of a fingerprint or palm print and compare it to a similar file stored at a local or remote database. In another example, the media guidance application may use a hash function or table to compute a hash value corresponding to the file in which the biometric characteristic is stored. The media guidance application may then cross-reference this hash value As referred to herein, a "time stamp" is defined to be any piece of data that identifies a time associated with a user command sequence. In some cases, the time stamp may identify a single time, such as the time at which the user command sequence was last used. In other cases, the time stamp may be defined relative to an event. For example, the time stamp may denote that the user command sequence is used, on average, five minutes after the first time a particular user equipment device is used on a given day. In still other cases, the time stamp may represent a range of times, such as 7:05 AM to 7:15 AM.

As referred to herein, an "active device" is defined to be any device that is not in a sleep or power saving mode and is configured such that it can be interacted with in its intended manner. For example, a device that is powered off would not be an active device. In another example, a device that generates images for display and is intended to be used with a screen (e.g., a set-top box) would not be an active device if it were powered on but not connected to a display. It would also not be an active device if it were powered on and connected to the display but the display was not configured to show the images generated by the set-top box (e.g., the display was set to receive data from a different input).

Figure 5:
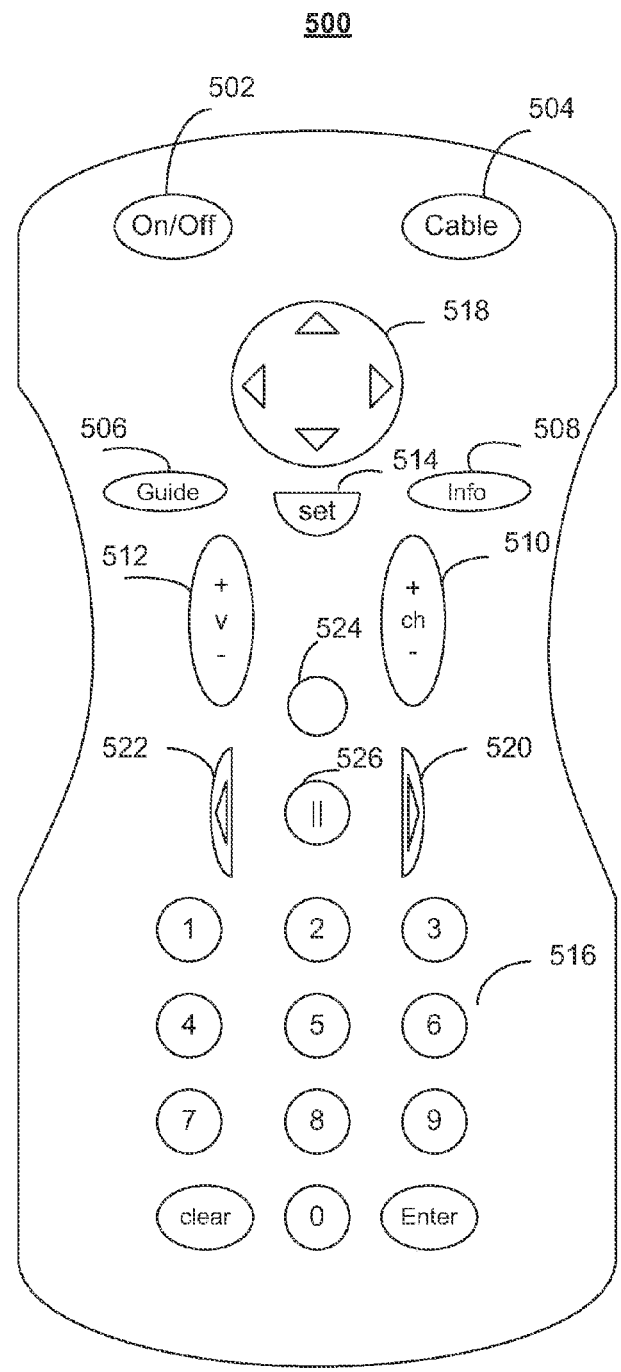
FIG. 5 shows a view of an illustrative remote control device in accordance with some embodiments of the disclosure.

FIG. 5 shows a view of an illustrative remote control device, remote control device 500. Remote control device 500 includes an on/off button 502, a cable button 504, a guide button 506, an info. button 508, a channel button 510, a volume button 512, a set button 514, a keypad 516, a navigation button 518, a fast-forward button 520, a rewind button 522, a select button 524, a pause button 526, a communication interface (not shown), and a biometric characteristic reader (not shown).

In operation, a user may press the on/off button 502 to turn an electronic device on or off. If remote control device 500 is used to control a cable set-top box, the cable button 504 may be used to turn on/off the set-top box connected usually to a television system. Other buttons, such as the guide button 506 and the info. button 508, may allow a user to interact with a media guide according to the descriptions for FIGS. 1-4. A user may further increment or decrement a channel using the channel button 510. Similarly, a user may change the volume by interacting with the volume button 512.

The set button 514 may be used in various ways. In some situations, the set button 514 may allow a user to implement a highlighted program. In other situations, the set button 514 may allow a user to configure settings of an electronic device through interacting with a user interface application such as the media guidance application. The navigation button 518 allows a user to move a highlight region 110 on a user interface in two dimensions by moving the highlight region 110 up/down or left/right. The fast forward and rewind buttons 520 and 522, respectively, may allow a user to fast forward or rewind a recorded show, an on-demand show, or any media content. The select button 524 may allow a user to pick an option within the media guidance application using remote control device 500.

It should be noted that remote control device 500 and the buttons and modes of interaction associated with it are illustrative only and not meant to be limiting. It is contemplated that additional, different, or fewer buttons or other interface options may also be included in some embodiments.

FIG. 6 shows an exemplary data structure for a command sequence entry associated with a user in accordance with some embodiments of the disclosure. In some embodiments, as discussed above, command sequence entry 600 may be stored in a database of user command sequences (e.g., locally at storage circuitry 308 or remotely and accessed via communications network 414). It should be noted that the information included in command sequence entry 600 is illustrative and should not be taken to be limiting in any way.

Command sequence entry 600 includes line 602. Line 602 indicates to the media guidance application that command sequence entry 600 is a user command sequence. Command sequence entry 600 includes command sequence information and information about the user that may be used by the media guidance application to determine which user command sequence to issue (using remote control device 500). Line 628 indicates to the media guidance application the end of the command sequence entry.

Line 604 indicates to the media guidance application the beginning of the user details. Command sequence entry 600 includes information on the name (e.g., line 606), profile (e.g., line 608), and biometric characteristics (e.g., line 610) of the user. Line 610 may list, for example, the location of a file containing the biometric characteristics of the user. In another example, line 610 may give a computed hash that corresponds to said biometric characteristic file. Line 612 indicates to the media guidance application the end of the user details.

Line 614 indicates to the media guidance application the beginning of the commands involved in the user command sequence. The sequence commands include, as discussed above, an ordered set of commands that can be issued to a user equipment device. In this case, the sequence comprises a power command (e.g., line 618, analogous to pressing on/off button 502 on remote control device 500), a guide command (e.g., line 620, analogous to pressing guide button 506 on remote control device 500), two consecutive right navigation commands (e.g., line 622 and line 624, analogous to pressing navigation button 518 on remote control device 500), and a select command (e.g., line 624, analogous to pressing select button 524 on remote control device 500). Line 626 indicates to the media guidance application the end of the commands involved in the user command sequence.

Command sequence entry 600 may also be used to record additional data associated with the user command sequence. For example, command sequence entry 600 may be used to record the time stamp or frequency of use associated with the user command sequence. In another example, command sequence entry 600 may comprise information about the remote control devices that issue the commands (e.g., the commands of line 616 through line 624) or the user equipment devices that receive them. Similarly, command sequence entry 600 may comprise information about the format in which the commands should be issued.

It should be noted that the lines in command sequence entry 600 are illustrative only and not meant to be limiting. It is contemplated that additional, different, or fewer lines, which may represent any other information found in a command sequence entry, may also be included in some embodiments.

In some embodiments, a media guidance application may detect (e.g., using control circuitry 304) that a user intends to use a remote control device (e.g., remote control device 500). In some embodiments, the media guidance application may detect a movement of remote control device 500. For example, the media guidance application may use a gyroscope integrated into remote control device 500 to detect a change in orientation of remote control device 500. If the media guidance application detects that the orientation of remote control device 500 has been changed (e.g., it has been tilted while being lifted from a surface), the media guidance application may determine that a user intends to use remote control device 500. The media guidance application may make use of any appropriate mechanism or device integrated into remote control device 500 to determine that the user intends to use remote control device. For example, the media guidance application may use the biometric characteristic reader of remote control device 500 to both identify the user and determine that the user intends to use remote control device 500.

The media guidance may then determine (e.g., using control circuitry 304) an identity of the user. In some embodiments, the media guidance application may identify a biometric characteristic associated with the user. For example, the media guidance application may use a palm print reader integrated into the housing of the remote control device to determine the identity of the user based on his or her palm print. Any other suitable biometric characteristic may be used, including but not limited to palm vein patterns, hand geometry, and retinal patterns.

The media guidance application may then cross-reference (e.g., using control circuitry 304) a database (e.g., a remote server accessed via communications network 414) listing user command sequences frequently inputted by the identified user to determine a user command sequence with a high frequency of use. In some embodiments, a user command sequence may comprise an ordered set of commands issued using the remote control device (e.g., remote control device 500) for controlling a user equipment device. Examples of these commands include but are not limited to service-related commands (using guide button 506 or info button 508), channel selection commands (using keypad 516), and device selection commands (using cable button 504). The user commands in the user command sequence may correspond to buttons on a remote control device or to any commands that can be received by the user equipment device, whether or not they correspond to buttons on a given remote control device. For example, the user commands in the user command sequence may correspond to voice commands that can be received and/or recognized by the media guidance application. A user command sequence may be an ordered set of any number of such commands.

In some embodiments, the media guidance application may rank (e.g., using control circuitry 304) the user command sequences frequently inputted by the identified user based on a frequency of use of each of the user command sequences. For example, when cross-referencing the database of user command sequences, the media guidance application may rank the user command sequences based on how frequently each has been used over a given period of time. The media guidance application may use this ranking to select a user command sequence to be issued. For example, the media guidance application may select (e.g., using control circuitry 304) the most frequently used sequence based on this ranking. In another example, the media guidance application may select a user command sequence at random from among the n most frequently used sequences, where n is an integer number of user command sequences (e.g., set according to user preferences or default programming). In still another example, if the media guidance application determines that multiple user command sequences have time stamps corresponding to the current time (as discussed with regards to FIG. 8), the media guidance application may select the most frequently used sequence of the sequences having time stamps corresponding to the current time.

In some embodiments, in order to determine whether to issue the user command sequence from the remote control, the media guidance application may compare (e.g., using control circuitry 304) a frequency of use of the user command sequence to a threshold frequency of use. For example, the media guidance application may determine (e.g., by cross-referencing the database of user command sequences discussed above) that a given user command sequence is used, on average over the past month, 10.5 times per week. If the minimum usage threshold is set at 10 times per week, the media guidance application may determine that it should issue the user command sequence since its frequency of use is greater than the threshold frequency of use.

The media guidance application may then, in response to determining the user command sequence with the high frequency of use, issue (e.g., using control circuitry 304) the user command sequence from the remote control (e.g., remote control device 500) automatically and without user input. For example, if the media guidance application is implemented at least partially on remote control device 500, the media guidance application may use the communication interface and associated circuitry of remote control device 500 to issue the user command sequence. If the media guidance application is implemented on a separate user equipment device (for example, the media guidance application is implemented on user computer equipment 404 and the remote control device being used is wireless user communications device 406), the media guidance application may transmit a request to the remote control device to issue the user command sequence. In some cases, if the media guidance application is implemented on the user equipment device associated with the selected user command sequence, the media guidance application may perform the actions corresponding to the commands without requiring them to be issued by remote control device 500.

In some embodiments, the media guidance application may monitor (e.g., using control circuitry 304) issued commands from the user over a period of time. For example, the media guidance application may record a log (e.g., located at storage circuitry 308) of commands manually issued by the user (i.e., not automatically issued using the methods described herein). The commands may be stored for a regular period of time (e.g., the past 60 days) or over the course of one or more usage sessions (e.g., from the time when the user equipment device becomes an active device, as previously defined, until the time when the user equipment device is no longer active). The media guidance application may record information beyond the commands themselves, including but not limited to the context in which the commands were received (e.g., the channel being watched or the menu being accessed by the user).

The media guidance application may then determine (e.g., using control circuitry 304) a recent user command sequence associated with the user based on the issued commands. For example, the media guidance application may determine that, over the past month, the user has issued the same sequence of commands each Thursday and Friday when first using remote control device 500 in the evening (e.g., after 5:00 PM). Based on this, the media guidance application may determine that this sequence of commands constitutes a recent user command sequence associated with the user. In some cases, the media guidance application may determine that a set of user commands comprise a user command sequence only if each command in the sequence is received within a period of time (e.g., two seconds) of the previous command. In other cases, the media guidance application may determine that a set of user commands comprise a user command sequence only if the sequence comprises fewer than or more than a given threshold number of inputs. For example, the media guidance application may only determine that a set of user commands comprise a user command sequence if the set contains at most 10 commands. If the media guidance application frequently detects a series of user commands longer than 10 commands, the media guidance application may determine that a subset of the series comprising 10 consecutive user commands (e.g., the first 10 or the last 10 commands in the series) is a user command sequence. In another case, the media guidance application may set a maximum number of screens over which the set of user commands comprising a user command sequence may take place. For example, the media guidance application may determine that a set of user commands comprise a user command sequence only if the set of user commands takes place over a maximum of three different screens. In yet another case, the media guidance application may determine that a set of user commands comprise a user command sequence only if the same set of user commands is received more than a certain threshold number of times during a given period of time. For example, the media guidance application may determine that a set of user commands comprise a user command sequence only if the set is received at least twice per day for a week. These thresholds may be set according to user preferences, default programming, or any other suitable criterion. The media guidance application may then cause the user command sequence to be stored, such as at the database of user command sequences discussed above.

In some embodiments, the media guidance application may, when determining a user command sequence, determine (e.g., using control circuitry 304) a current time. In some cases, the media guidance application may determine the current time using a clock integrated into the system on which the media guidance application is implemented. In other cases, the media guidance application may determine the current time by querying a remote service (e.g., using communications network 414). For example, the media guidance application may determine that the current time is 8:00 PM on a Monday.

The media guidance application may also determine (e.g., using control circuitry 304) a time stamp associated with a previous use of the user command sequence. For example, the media guidance application may determine that the user command sequence has a time stamp that indicates that the user command sequence was last used at 8:25 PM one week ago. In another example, the media guidance application may determine that the user command sequence has a time stamp that indicates that the user command sequence is often issued at 8:15 PM on weekends. The media guidance application may determine the time stamp by cross-referencing the database of user command sequences. In such a case, the time stamp for each user command sequence may be stored in the database and associated with the corresponding user command sequence.

The media guidance application may then select (e.g., using control circuitry 304) the user command sequence based on determining that the current time and the time stamp correspond. To do this, the media guidance application may compare the current time to the time stamp. The media guidance application may determine that the current time and the time stamp correspond if the indicated times fall within a given threshold range of time (e.g., that they fall within 30 minutes of one another). This threshold range may be set according to user preferences, default programming, or any other suitable criterion. Following one of the examples given above, if the time stamp indicates that the user command sequence was last issued at 8:25 PM one week ago, the media guidance application may compare the current time (8:00 PM on a Monday) to the time stamp and determine that the two times fall within 30 minutes of one another and thus correspond. It should be noted, however, that a user command sequence last used one week ago may not have a frequency of use that exceeds the frequency of use threshold, as discussed with regards to process 804. Following the other example given above, if the time stamp indicates that the user command sequence is usually issued at 8:15 PM on weekends, the media guidance application may compare the current time (8:00 PM on a Monday) to the time stamp and determine that the two times do not correspond as Monday is not part of the weekend.

In some embodiments, the media guidance application may determine (e.g., using control circuitry 304) whether a user equipment device is active. For example, the media guidance application may detect that the user has picked up the remote control associated with the user's FanTV box. The media guidance application may then determine whether the FanTV box is active. The process of determining whether a user equipment device is active is discussed in further detail below with regard to FIG. 10. For example, the media guidance application may determine that the FanTV box is powered on, but the television to which the FanTV box is connected is set to DVI input (e.g., for a computer) instead of HDMI (e.g., for the set-top box). In such a case, the media guidance application may determine that the FanTV box is not active.

In response to determining that the FanTV box (or any other given user equipment device) is not active, the media guidance application may query (e.g., using control circuitry 304) the user equipment device (e.g., the FanTV box) to determine a command for making the user equipment device active. For example, the media guidance application may determine, based on a user profile, the model of the FanTV box. The media guidance application may then cross-reference the model of the FanTV box with a database of models of user equipment devices and their corresponding commands. Based on this cross-referencing, the media guidance application may determine the appropriate command to issue using remote control device 500. In another example, the media guidance application may query the user equipment device (e.g., the FanTV box) directly to determine the proper activation command (e.g., if the user equipment device is powered on but otherwise inactive, as defined above).

After determining the command for making the user equipment active, the media guidance application may issue (e.g., using remote control device 500), automatically and without user input, the command for making the user equipment device active. Following the example given above, the media guidance application may use remote control device 500 to issue the command to change the television input from component to HDMI in order to make the FanTV box active. Once the FanTV box is active, the media guidance application may determine and issue a user command sequence as previously discussed.

In some embodiments, the media guidance application may detect (e.g., using control circuitry 304) an input from a user. For example, the media guidance application may issue a user command sequence from remote control device 500, as described above. After the user command sequence has been issued, the media guidance application may detect an input from the user. The media guidance application may then create (e.g., using control circuitry 304) an augmented user command sequence based on the input and the user command sequence. For example, the media guidance application may create an augmented user command sequence that adds to, replaces, or deletes a portion of the user commands in the user command sequence, as appropriate. The process of determining whether to add to or replace a portion of the user command sequence is discussed in further detail below with regard to FIG. 9. Once the augmented user command sequence has been created, the media guidance application may cause the augmented user command sequence to be stored (e.g., using the database of user command sequences).

In some cases, the media guidance application may only use the detected user input to augment the user command sequence if it is the first input detected after the user command sequence is issued. For example, the media guidance application may not create the augmented user command sequence if multiple inputs are detected before the input that is relevant to the user command sequence.

Figure 7:
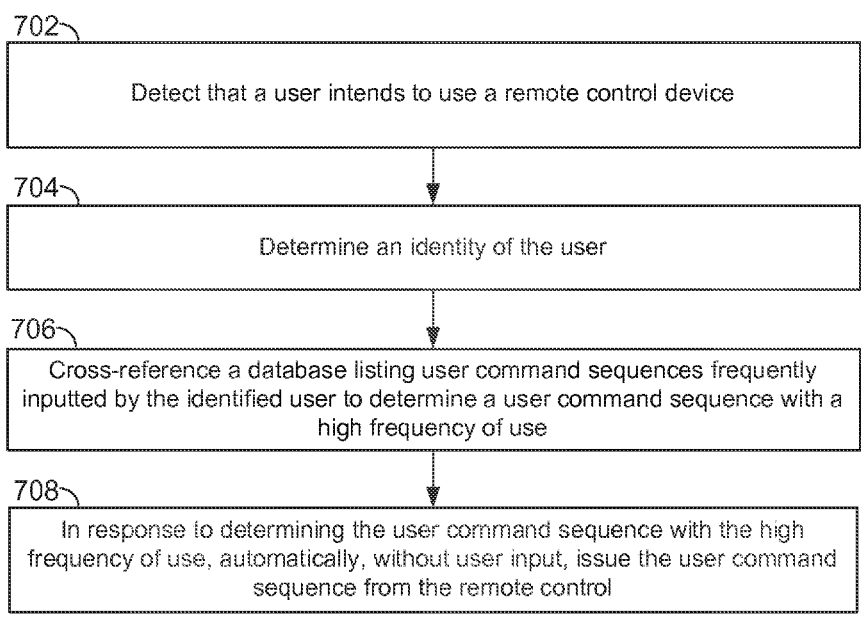
FIG. 7 is a flowchart of illustrative steps for issuing a user command sequence in accordance with some embodiments of the disclosure.

FIG. 7 is a flowchart of illustrative steps for issuing a user command sequence in accordance with some embodiments of the disclosure. It should be noted that process 700 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) to cause a portion of a media asset to be stored when a starting position and an ending position of the portion have been indicated by the user. In addition, one or more steps of process 700 may be incorporated into or combined with one or more steps of any other process or embodiment.

At step 702, the media guidance application detects (e.g., using control circuitry 304) that a user intends to use a remote control device. For example, the media guidance application may determine, using an accelerometer integrated into remote control device 500 to detect that remote control device 500 has been moved. If the media guidance application detects that remote control device 500 has been raised (e.g., lifted from a surface) and is being held horizontally, the media guidance application may determine that a user intends to use the remote control device.

At step 704, the media guidance application determines (e.g., using control circuitry 304) an identity of the user. For example, as discussed previously, the media guidance application may detect a biometric characteristic associated with the user (e.g., using the biometric characteristic reader integrated into remote control device 500). The media guidance application may cross-reference the detected biometric characteristic with a database listing user identities and corresponding biometric characteristics. The database may be local (e.g., stored at storage circuitry 308) or remote (e.g., media guidance data source 418 accessed via communications network 414) to the media guidance application (e.g., as implemented on a user equipment device). By doing so, the media guidance application may determine an identity of the user.

At step 706, the media guidance application cross-references (e.g., using control circuitry 304) a database listing user command sequences frequently inputted by the identified user to determine a user command sequence with a high frequency of use. For example, the media guidance application may determine that a particular user command sequence has, out of all of the user command sequences in the database, the highest frequency of use over the past month. The database may be local (e.g., stored at storage circuitry 308) or remote (e.g., media guidance data source 418 accessed via communications network 414) to the media guidance application (e.g., as implemented on a user equipment device) and may be the same database that stores the biometric characteristics and user identities as discussed above.

After determining a user command sequence, the media guidance application proceeds to step 708. At step 708, the media guidance application, in response to determining the user command sequence with the high frequency of use, automatically and without user input, issues the user command sequence from a remote control device (e.g., remote control device 500). For example, if the media guidance application determined at step 706 that the user command sequence corresponding to command sequence entry 600 is the user command sequence with the high frequency of use, the media guidance application may issue the user commands (represented by line 616 through line 624 in FIG. 6) using remote control device 500.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

Figure 8:
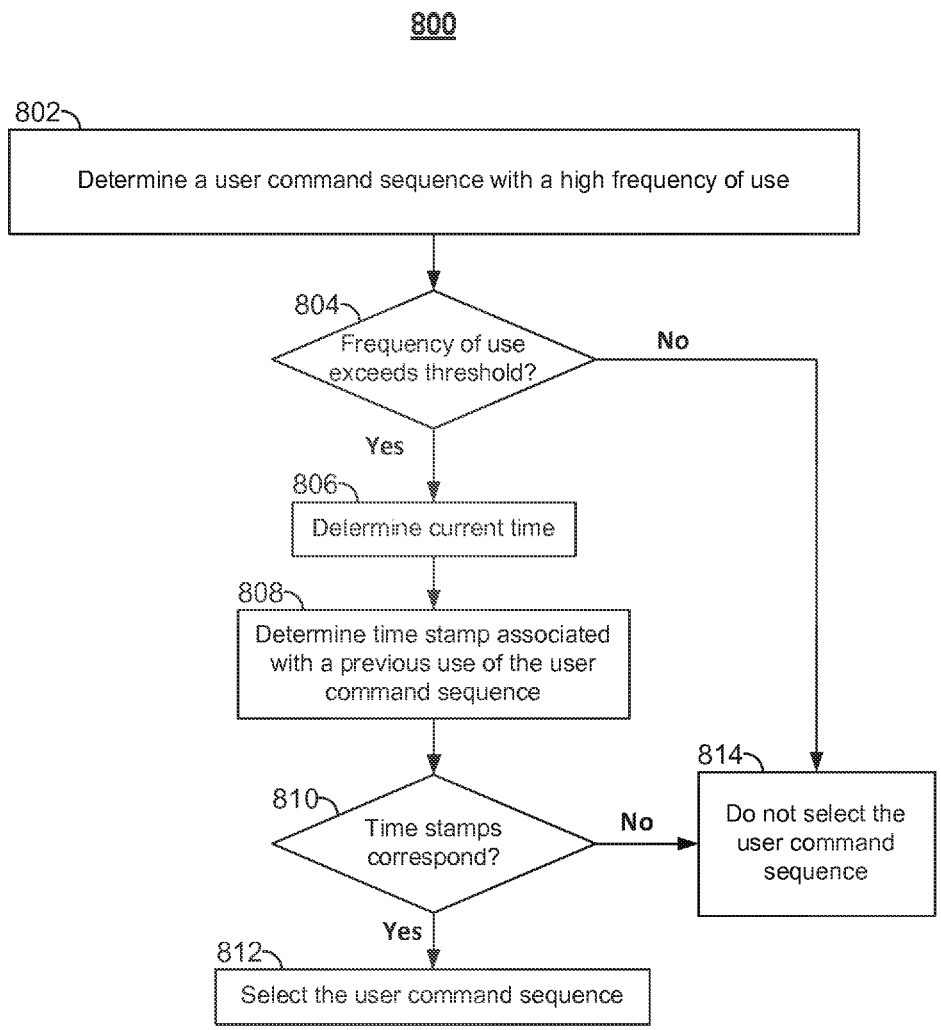
FIG. 8 is a flowchart of illustrative steps for selecting a user command sequence in accordance with some embodiments of the disclosure.

FIG. 8 is a flowchart of illustrative steps for selecting a user command sequence in accordance with some embodiments of the disclosure. It should be noted that process 800 or any step thereof could be performed on, or provided by, any of the devices shown in FIGS. 3-5. For example, process 800 may be executed by control circuitry 304 (FIG. 3) as instructed by control circuitry implemented on user equipment 402, 404, and/or 406 (FIG. 4) to cause a portion of a media asset to be stored when a starting position and an ending position of the portion have been indicated by the user. In addition, one or more steps of process 800 may be incorporated into or combined with one or more steps of any other process or embodiment.

At step 802, the media guidance application determines (e.g., using control circuitry 304) a user command sequence with a high frequency of use. For example, as discussed previously, the media guidance application may rank (e.g., using control circuitry 304) the user command sequences frequently inputted by the identified user based on a frequency of use of each of the user command sequences. For example, when cross-referencing the database of user command sequences, the media guidance application may rank the user command sequences based on how frequently each has been used over a given period of time. The media guidance application may determine the most frequently used sequence based on this ranking to be a user command sequence with a high frequency of use.

At step 804, the media guidance application determines (e.g., using control circuitry 304) whether the frequency of use exceeds a frequency of use threshold. For example, the media guidance application may determine (e.g., by cross-referencing the database of user command sequences discussed above) that a given user command sequence is used, on average over the past month, 10 times per week. If the minimum usage threshold is set at 15 times per week, the media guidance application may determine that the frequency of use of the user command sequence does not exceed the threshold. In such a case, the media guidance application proceeds to step 814. At step 814, the media guidance application does not select the user command sequence. If, on the other hand, the minimum usage threshold is set at five times per week, the media guidance application may determine that the frequency of use does exceed the threshold. In that case, the media guidance application proceeds to step 806.

At step 806, the media guidance application (e.g., using control circuitry 304) determines the current time. For example, the media guidance application may determine the current time using a clock integrated into the system on which the media guidance application is implemented (e.g., processing circuitry 306). In another example, the media guidance application may determine the current time by querying a remote service (e.g., using communications network 414). For example, the media guidance application may determine that the current time is 6:00 PM on a Thursday in March.

At step 808, the media guidance application determines (e.g., using control circuitry 304) a time stamp associated with a previous use of the user command sequence. As defined previously, a time stamp is any piece of data that identifies a time associated with a user command sequence. For example, the user may often issue a certain user command sequence to access a March Madness application in the month of March. The media guidance application may determine that such a user command sequence has a time stamp that indicates that the user command sequence is often issued after 5:00 PM on days in March. The media guidance application may determine the time stamp by cross-referencing the database of user command sequences. In such a case, the time stamp for each user command sequence may be stored in the database and associated with the corresponding user command sequence.

At step 810, the media guidance application determines (e.g., using control circuitry 304) whether the time stamp and the current time correspond. Following the example given above, the media guidance application may compare the current time (6:00 PM on a Thursday in March) with the time stamp (indicating that the user command sequence is often issued after 5:00 PM on days in March) and determine that they correspond. After determining that the time stamp and the current time correspond, the media guidance application proceeds to step 812. On the other hand, if the media guidance application determines that the current time and the time stamp do not correspond (e.g., if the current time is 3:00 PM instead of 6:00 PM), the media guidance application proceeds to step 814. At step 814, as discussed, the media guidance application does not select the user command sequence.

At step 812, the media guidance application selects (e.g., using control circuitry 304) the user command sequence. At this point, the media guidance application may issue the selected user command sequence (e.g., using remote control device 500) as discussed with regard to FIG. 7.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 8.

Figure 9:
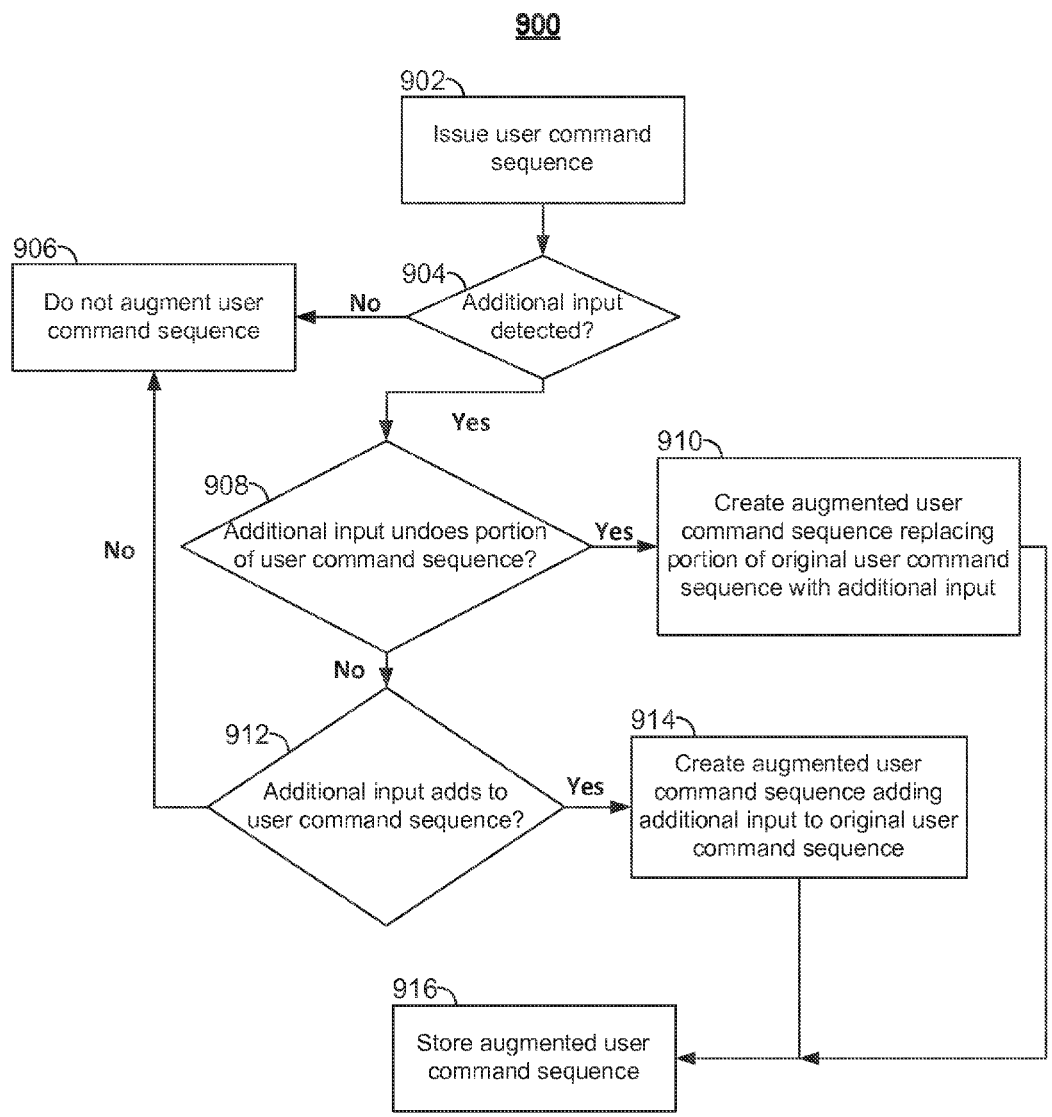
FIG. 9 is a flowchart of illustrative steps for augmenting a user command sequence in accordance with some embodiments of the disclosure.

FIG. 9 is a flowchart of illustrative steps for augmenting a user command sequence in accordance with some embodiments of the disclosure. It should be noted that process 900 or any step thereof could be performed on, or provided by, any of the devices shown in FIGS. 3-5. For example, process 900 may be executed by control circuitry 304 (FIG. 3) as instructed by control circuitry implemented on user equipment 402, 404, and/or 406 (FIG. 4) to cause a portion of a media asset to be stored when a starting position and an ending position of the portion have been indicated by the user. In addition, one or more steps of process 900 may be incorporated into or combined with one or more steps of any other process or embodiment.

At step 902, the media guidance application issues (e.g., via remote control device 500) a user command sequence. This process may take place as previously discussed with regard to step 708 of FIG. 7. After issuing the user command sequence, the media guidance application, at step 904, determines (e.g., using control circuitry 304) whether an additional input has been detected. In some embodiments, the media guidance application may only consider a detected additional input if it is detected within a certain threshold period of time. For example, the media guidance application may only proceed with the remaining processes in process 900 if the additional input is detected within five seconds of the user command sequence being issued. This threshold may be set according to user preferences, default programming, or any other suitable criterion. The media guidance application may detect the additional input as issued from the same remote control device (e.g., remote control device 500) that was used to issue the original user command sequence. Alternately, the media guidance application may detect additional inputs as issued using a different device or medium. For example, if the media guidance application caused a conventional remote control device to issue the user command sequence, the media guidance application may detect an additional input in the form of a voice command received by the user's smartphone. If the additional input is detected after this threshold or if the media guidance application has not detected an additional input, the media guidance application proceeds to step 906. At step 906, the media guidance application does not augment the user command sequence.

Otherwise, if the media guidance application detects an additional input, the media guidance application proceeds to step 908. At step 908, the media guidance application determines (e.g., using control circuitry 304) whether the additional input undoes a portion of the user command sequence. The media guidance application may determine that the additional input undoes a portion of the user command sequence if it performs the opposite action as a command in the user command sequence. For example, the media guidance application may determine that an additional input comprising a left directional command (e.g., using navigation button 518 on remote control device 500) undoes (i.e., performs the opposite action as) a right directional command in the user command sequence (e.g., line 620 of command sequence entry 600). Other such pairs of opposites include but are not limited to volume up and down (e.g., using volume button 512), channel up and down (e.g., using channel button 510), rewind and fast-forward (e.g., using rewind button 522 and fast-forward button 520, respectively), and power on and power off (e.g., using on/off button 502). The media guidance application may determine that an additional input undoes a portion of the user command sequence by cross-referencing the additional input with a database listing a plurality of inputs and their opposites. The database may be local (e.g., stored at storage circuitry 308) or remote (e.g., media guidance data source 418 accessed via communications network 414) to the media guidance application.

In some cases, the media guidance application may only determine that the additional input undoes a portion of the user command sequence if it undoes the most recently issued command in the sequence. For example, the media guidance application may cause remote control device 500 to issue the user command sequence given in FIG. 6. If the media guidance application detects an additional input comprising a left directional command (e.g., using navigation button 518 on remote control device 500), it may determine that the additional input does not undo a portion of the user command sequence as the left directional command does not undo the most recently issued command in the sequence (e.g., the select command of line 624). In other cases, the media guidance application may determine that the additional input undoes a portion of the user command sequence if it undoes any command in the sequence. In such a case, the media guidance application may determine that the additional input (here, the left directional command) undoes a portion of the user command sequence (e.g., the right directional command of line 620 or line 622).

In some cases, the media guidance application may determine that multiple additional inputs undo a portion of the user command sequence. For example, the media guidance application may cause remote control device 500 to issue the user command sequence given in FIG. 6. If the media guidance application detects an additional input comprising an "exit" command and two left directional commands (e.g., using navigation button 518 on remote control device 500), the media guidance application may determine that these three additional inputs undo a portion of the user command sequence (e.g., the commands of line 620 through line 624). In another example, the media guidance application may determine that a single additional input undoes a portion of the user command sequence that comprises multiple commands. For example, the media guidance application may cause remote control device 500 to issue a user command sequence comprising multiple commands, including selecting a service or menu and then navigating within it without selecting another option. If the media guidance application detects an additional input comprising an "exit" command, the media guidance application may determine that the additional input undoes the portion of the user command sequence starting at the selection of the service or menu.

If the media guidance application determines that the additional input undoes a portion of the user command sequence, the media guidance application proceeds to step 910. At step 910, the media guidance application creates (e.g., using control circuitry 304) an augmented user command sequence based on the original user command sequence and the additional input. For example, the media guidance application may remove the commands that were undone from the original user command sequence to form the augmented user command sequence. In another example, the media guidance application may replace the portion of the user command sequence with the additional input.

After creating the augmented user command sequence based on the original user command sequence and the additional input, the media guidance application may proceed to step 916. At step 916, the media guidance application causes (e.g., using control circuitry 304) the augmented user command sequence to be stored. For example, the media guidance application may cause the augmented user command sequence to be stored at the database of user command sequences. In another example, the media guidance application may cause the augmented user command sequence to be stored at an auxiliary database comprising augmented user command sequences. In either case, the augmented user command sequence may be stored locally at storage circuitry 308 or at a remote database via communications network 414.

If, at step 908, the media guidance application determines that the additional input does not undo a portion of the user command sequence, the media guidance application proceeds to step 912. At step 912, the media guidance application determines (e.g., using control circuitry 304) whether the additional input adds to the user command sequence. The media guidance application may determine that an additional input adds to the user command sequence if it does not undo a portion of the user command sequence (as discussed previously). The media guidance application may also determine that an additional input adds to the user command sequence if it is the same type of input as the most recently issued command in the user command sequence. For example, the media guidance application may cause remote control device 500 to issue a user command sequence in which the final command is a navigation command. If the media guidance application detects an additional input comprising a further navigational command (e.g., using navigation button 518 of remote control device 500), the media guidance application may determine that the additional input adds to the user command sequence as it is of the same type as the most recently issued command. However, if the media guidance application detects an additional input comprising a volume control command (e.g., using volume button 512 of remote control device 500), the media guidance application may determine that the additional input does not add to the user command sequence as it is not of the same type as the most recently issued command. The media guidance application may determine that an additional input if of the same type as a command from the user command sequence by cross-referencing the additional input with a database listing a plurality of inputs and their types. The database may be local (e.g., stored at storage circuitry 308) or remote (e.g., media guidance data source 418 accessed via communications network 414) to the media guidance application.

If the media guidance application determines that the additional input does not add to the user command sequence, the media guidance application has determined that the additional input neither undoes a portion of the user command sequence nor adds to the user command sequence. As such, the media guidance application proceeds to step 906 and does not augment the user command sequence.

Otherwise, if the media guidance application determines that the additional input adds to the user command sequence, the media guidance application proceeds to step 914. At step 914, the media guidance application creates (e.g., using control circuitry 304) an augmented user command sequence adding the additional input to the original user command sequence. For example, the media guidance application may create the augmented user command sequence by appending the additional input to the end of the original user command sequence.

After creating the augmented user command sequence adding the additional input to the original user command sequence, the media guidance application proceeds to step 916. At step 916, as discussed previously, the media guidance application causes (e.g., using control circuitry 304) the augmented user command sequence to be stored. For example, the media guidance application may cause the augmented user command sequence to be stored at the database of user command sequences. In another example, the media guidance application may cause the augmented user command sequence to be stored at an auxiliary database comprising augmented user command sequences. In either case, the augmented user command sequence may be stored locally at storage circuitry 308 or at a remote database via communications network 414.

The media guidance application may, during subsequent uses, automatically issue the augmented user command sequence instead of the corresponding original user command sequence. The media guidance application may determine to do this based on a frequency of use of the augmented user command sequence. For example, the media guidance application may monitor how often the user augments the user command sequence when it is issued. In some cases, if the media guidance application determines that this frequency of use of the augmented user command sequence exceeds a threshold frequency, the media guidance application may proceed to issue the augmented user command sequence instead of the original user command sequence. This threshold of use for the augmented user command sequence may be set according to user preferences, default programming, or any other suitable criterion. In other cases, if the media guidance application determines that this frequency of use of the augmented user command sequence exceeds the frequency of use of the original user command sequence, the media guidance application may proceed to issue the augmented user command sequence instead of the original user command sequence.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 9.

Figure 10:
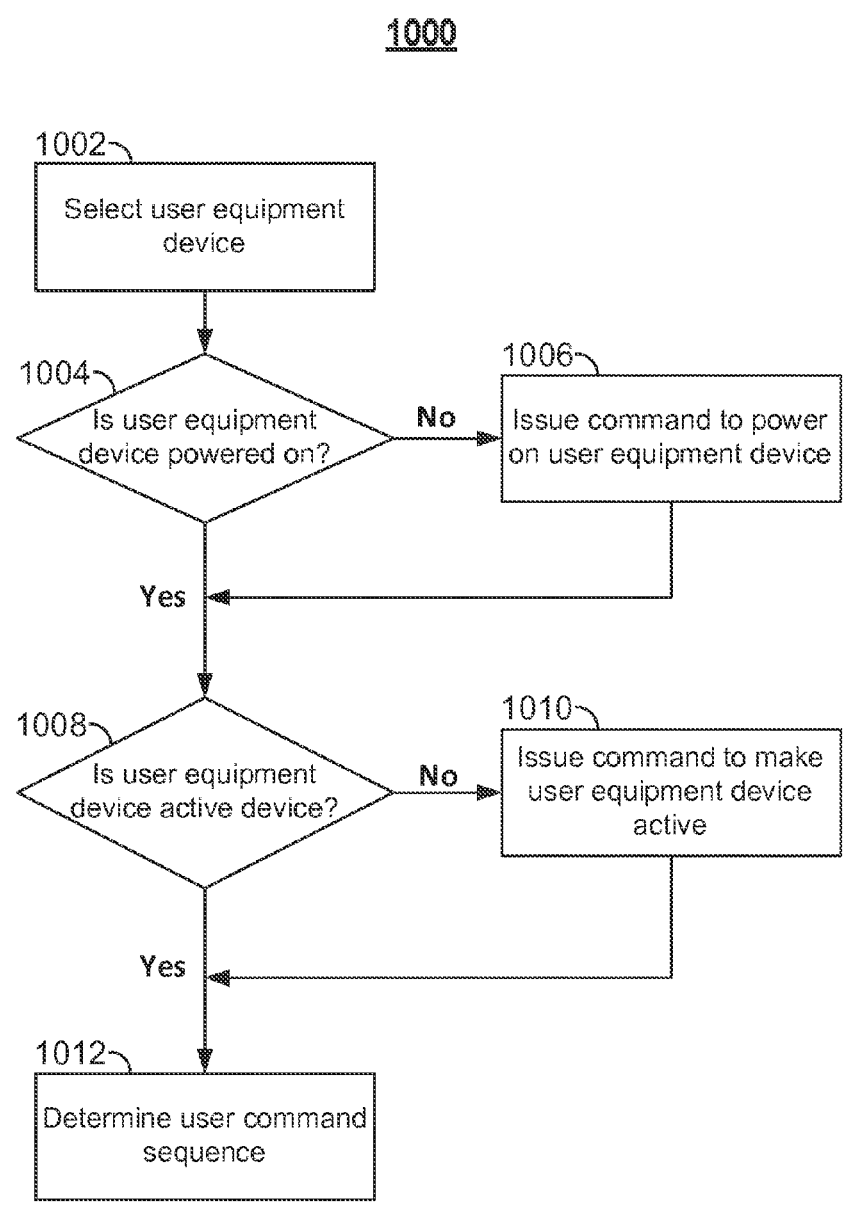
FIG. 10 is a flowchart of illustrative steps for activating a user equipment device before issuing a user command sequence in accordance with some embodiments of the disclosure.

FIG. 10 is a flowchart of illustrative steps for activating a user equipment device before issuing a user command sequence in accordance with some embodiments of the disclosure. It should be noted that process 1000 or any step thereof could be performed on, or provided by, any of the devices shown in FIGS. 3-5. For example, process 1000 may be executed by control circuitry 304 (FIG. 3) as instructed by control circuitry implemented on user equipment 402, 404, and/or 406 (FIG. 4) to cause a portion of a media asset to be stored when a starting position and an ending position of the portion have been indicated by the user. In addition, one or more steps of process 1000 may be incorporated into or combined with one or more steps of any other process or embodiment.

At step 1002, the media guidance application selects, using control circuitry 304, a user equipment device, such as user equipment 402, 404, and/or 406 (FIG. 4). For example, the media guidance application may determine that remote control device 500 is associated or paired with a particular user equipment device, such as user television equipment 402. In some cases, if remote control device 500 is a conventional infrared remote control, the media guidance application may make this determination by cross-referencing the model of the remote and the remote control code currently in use with a database of remote control codes (located at storage circuitry 308 or accessed via communications network 414). In other cases, such as if remote control device 500 is integrated into wireless user communications device 406, the media guidance application may query remote control device 500 to determine the user equipment device with which it is currently associated. In still other cases, the media guidance application may select a user equipment device based on information stored with the user command sequences in the database of user command sequences previously discussed. For example, the media guidance application may determine that a majority of the user command sequences that have been issued recently by the identified user involve a particular user equipment device. The media guidance application may then select that particular user equipment device.

At step 1004, the media guidance application determines, using control circuitry 304, whether the selected user equipment device is powered on. The media guidance application may make this determination by issuing a test command or query to the user equipment device using remote control device 500 and waiting for a response. If the media guidance application does not receive a response from the user equipment device, it may proceed to step 1006. At step 1006, the media guidance application may issue, using remote control device 500, a command to power on the user equipment device.

Once the media guidance application has determined that the user equipment device is powered on (either via the determination in step 1004 or the command issued in step 1006), the media guidance application proceeds to step 1008. At step 1008, the media guidance application determines whether or not the user equipment device is an active device. As defined previously, a user equipment device is active if it is not in a sleep or power saving mode and it is configured such that it can be interacted with in its intended manner. For example, a set-top box may be determined to be active if it is not in sleep mode and it is configured such that the displays it generates can be viewed on a display screen (such as display 312). Again, the media guidance application may make this determination by issuing a test command or query to the user equipment device using remote control device 500 and waiting for a response.

For example, the media guidance application may determine, based on a user profile, that the user's set-top box is connected to a given input on a display device (e.g., display 312). The media guidance application may also determine, by querying the user equipment device or the processing circuitry associated with the display device, that the display device is currently configured to receive data from a different input. In such a case, the set-top box would not be an active device. In another example, if remote control device 500 is integrated into a device that has a camera (e.g., a smartphone or tablet), the media guidance application may cause remote control device 500 to issue a test command that would cause the user equipment device to produce a known visual response. The media guidance application may then use the camera to detect the visual response. In such a case, the absence of said visual response may indicate that the user equipment device is not an active device. If, based on this, the media guidance application determines that the user equipment device is not an active device, it proceeds to step 1010.

At step 1010, the media guidance application issues, using remote control device 500, a command to make the user equipment device active. Following the example of the set-top box given above, the media guidance application may issue, using remote control device 500, a command to the display device to switch the active input to the input used by the set-top box. In another example, the media guidance application may issue, using remote control device 500, a command to power on the display device to which the user equipment device (e.g., the set-top box) is connected, if applicable.

At either step 1006 or step 1010, the media guidance application automatically determines the proper command and/or format of command to issue using remote control device 500. For example, as discussed previously, the media guidance application may make this determination by cross-referencing the model of the remote and/or the user equipment device with a database of remote control models and corresponding remote control codes (located at storage circuitry 308 or accessed via communications network 414). Based on this cross-referencing, the media guidance application may automatically determine the proper command and/or format of command to issue using remote control device 500. In other cases, such as if remote control device 500 is integrated into wireless user communications device 406, the media guidance application may query remote control device 500 to determine the user equipment device with which it is currently associated before performing the cross-referencing.

Once the media guidance application has determined that the user equipment device is active (either via the determination in step 1008 or the command issued in step 1010), the media guidance application proceeds to step 1012. At step 1012, the media guidance application determines a user command sequence to issue to the user equipment device, as discussed previously.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determining an identity of the user may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media asset correspondences as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for controlling user equipment devices with remote control devices, the method comprising:
    detecting that a user intends to use a remote control device;
    determining an identity of the user;
    cross-referencing a database listing user command sequences frequently inputted by the identified user to determine a user command sequence with a high frequency of use; and
    in response to determining the user command sequence with the high frequency of use, automatically, without user input, issuing the user command sequence from the remote control.

2. The method of claim 1, wherein the user command sequence comprises an ordered set of commands issued using the remote control for controlling a user equipment device.

3. The method of claim 1, further comprising ranking the user command sequences frequently inputted by the identified user based on a frequency of use of each of the user command sequences.

4. The method of claim 1, further comprising comparing:
comparing a frequency of use of the user command sequence to a threshold frequency of use; and
determining whether to issue the user command sequence from the remote control based on the comparison.

5. The method of claim 1, wherein determining that the user intends to use the remote control device comprises detecting a movement of the remote control device.

6. The method of claim 1, wherein determining the identity of the user comprises identifying a biometric characteristic associated with the user.

7. The method of claim 1, wherein determining the user command sequence further comprises:
determining a current time;
determining a time stamp associated with a previous use of the user command sequence; and
selecting the user command sequence based on determining that the current time and the time stamp correspond.

8. The method of claim 1, further comprising:
monitoring issued commands from the user over a period of time; and
determining a recent user command sequence associated with the user based on the issued commands.

9. The method of claim 1, further comprising:
determining whether a user equipment device is active;
in response to determining that the user equipment device is not active, querying the user equipment device to determine a command for making the user equipment device active; and
issuing, automatically, without user input, the command from the remote control for making the user equipment device active.

10. The method of claim 1, further comprising:
detecting an input from the user;
creating an augmented user command sequence based on the input and the user command sequence; and
causing the augmented user command sequence to be stored.

11. A system for controlling user equipment devices with remote control devices, the system comprising:
control circuitry configured to:
detect that a user intends to use a remote control device;
determine an identity of the user;
cross-reference a database listing user command sequences frequently inputted by the identified user to determine a user command sequence with a high frequency of use; and
in response to determining the user command sequence with the high frequency of use, automatically, without user input, issue the user command sequence from the remote control; and
storage circuitry configured to store the database listing user command sequences frequently inputted by the identified user.

12. The system of claim 11, wherein the user command sequence comprises an ordered set of commands issued using the remote control for controlling a user equipment device.

13. The system of claim 11, wherein the control circuitry is further configured to rank the user command sequences frequently inputted by the identified user based on a frequency of use of each of the user command sequences.

14. The system of claim 11, wherein the control circuitry is further configured to:
compare a frequency of use of the user command sequence to a threshold frequency of use; and
determine whether to issue the user command sequence from the remote control based on the comparison.

15. The system of claim 11, wherein the control circuitry is configured, when determining that the user intends to use the remote control device, to detect a movement of the remote control device.

16. The system of claim 11, wherein the control circuitry is configured, when determining the identity of the user, to identify a biometric characteristic associated with the user.

17. The system of claim 11, wherein the control circuitry is further configured, when determining the user command sequence, to:
determine a current time;
determine a time stamp associated with a previous use of the user command sequence; and
select the user command sequence based on determining that the current time and the time stamp correspond.

18. The system of claim 11, wherein the control circuitry is further configured to:
monitor issued commands from the user over a period of time; and
determine a recent user command sequence associated with the user based on the issued commands.

19. The system of claim 11, wherein the control circuitry is further configured to:
determine whether a user equipment device is active;
in response to determining that the user equipment device is not active, query the user equipment device to determine a command for making the user equipment device active; and
issue, automatically, without user input, the command from the remote control for making the user equipment device active.

20. The system of claim 11, wherein the control circuitry is further configured to:
detect an input from the user;
create an augmented user command sequence based on the input and the user command sequence; and
cause the augmented user command sequence to be stored.

* * * * *